April 17, 1945.　　　T. KORLING　　　2,374,021
ALL-METAL FOLDING CAMERA STAND
Original Filed May 6, 1941　　3 Sheets-Sheet 1
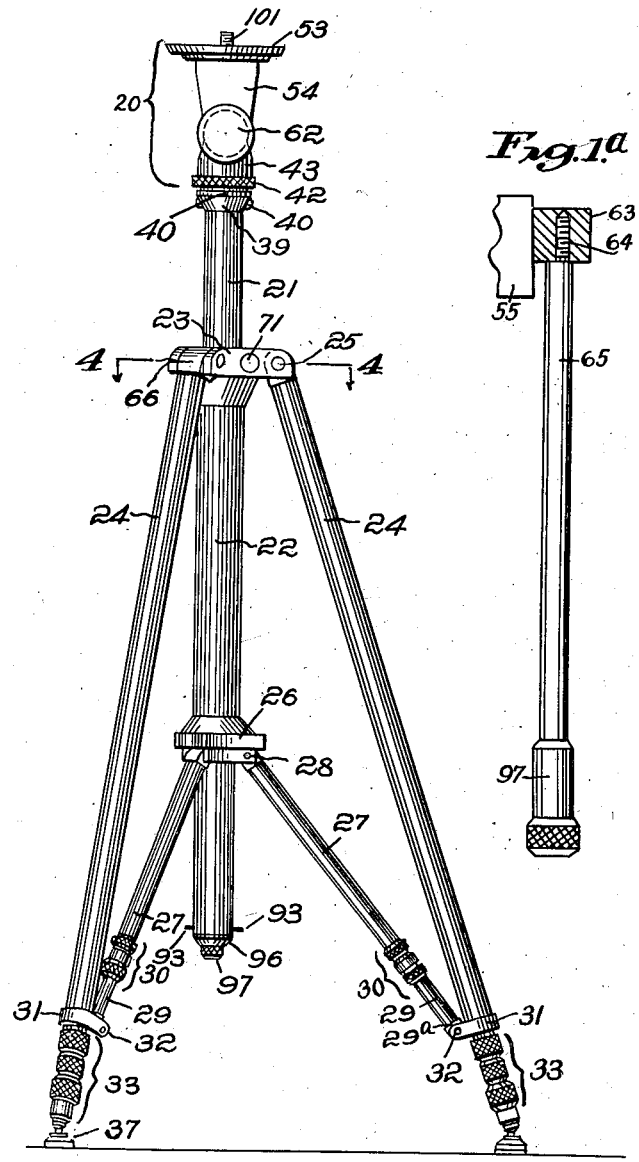

April 17, 1945.　　　T. KORLING　　　2,374,021
ALL-METAL FOLDING CAMERA STAND
Original Filed May 6, 1941　　3 Sheets-Sheet 2
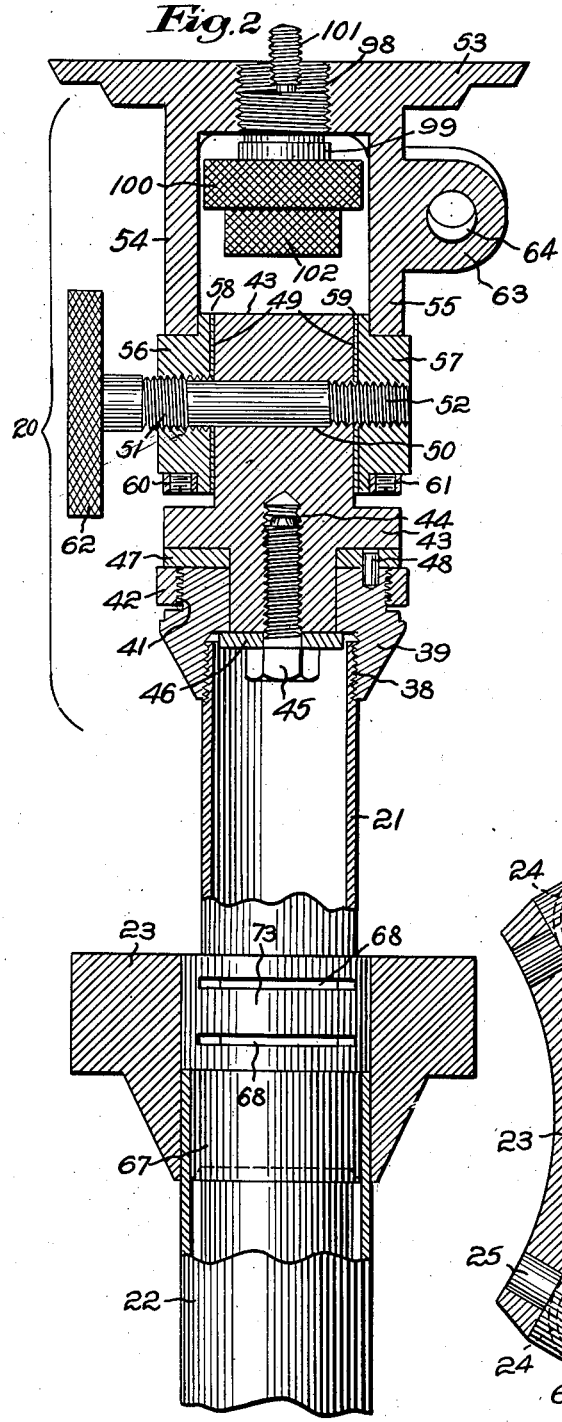
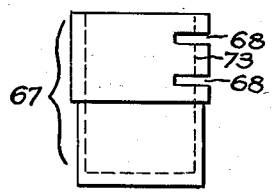
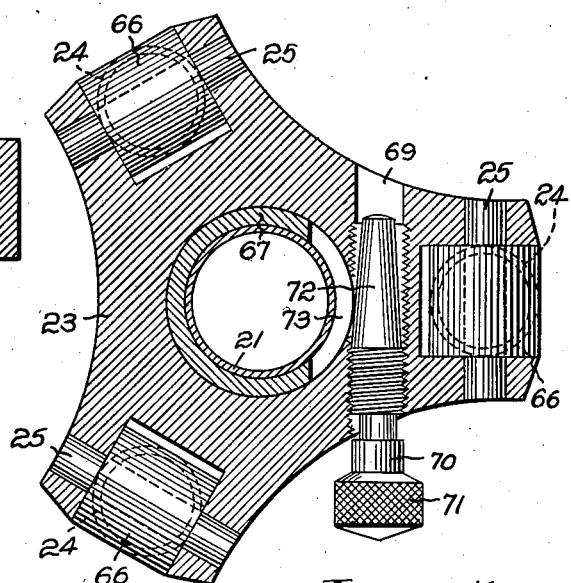
Inventor:
Torkel Korling.
by Emery, Booth, Townsend, Millhan Loeding
Attys April 17, 1945. T. KORLING 2,374,021
ALL-METAL FOLDING CAMERA STAND
Original Filed May 6, 1941 3 Sheets-Sheet 3
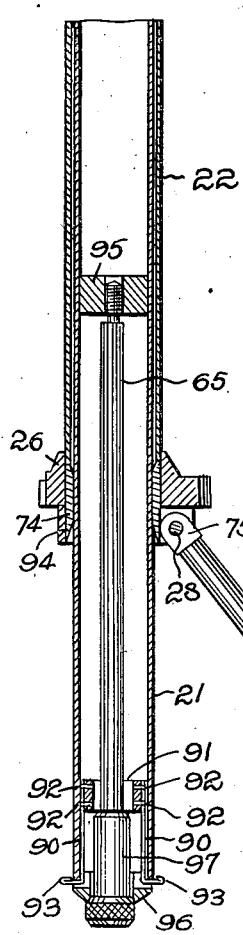
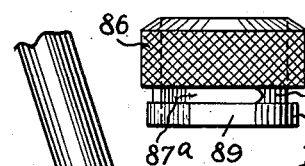
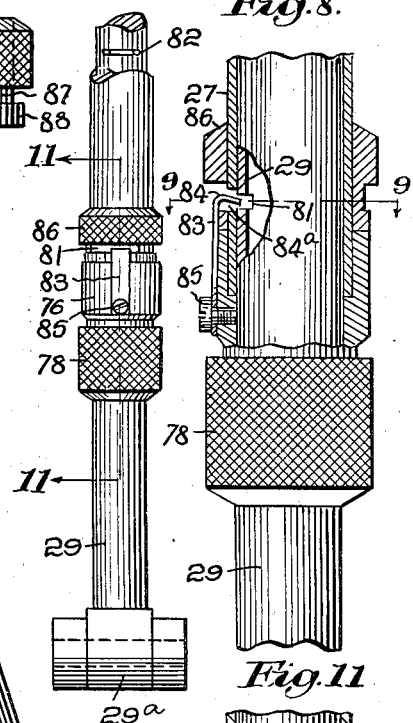
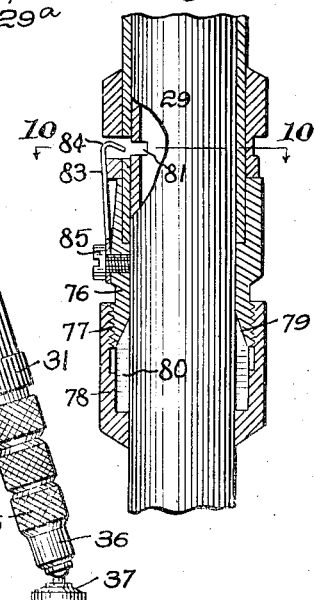
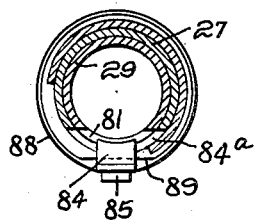
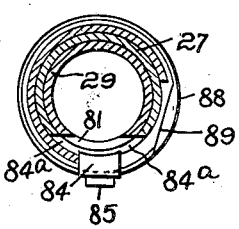
Inventor:
Torkel Korling Patented Apr. 17, 1945

2,374,021

UNITED STATES PATENT OFFICE 2,374,021

ALL-METAL FOLDING CAMERA STAND

Torkel Korling, Chicago, Ill., assignor to The Folmer Graflex Corporation, Rochester, N. Y., a corporation of Delaware Original application May 6, 1941, Serial No. 392,080, now Patent No. 2,323,473, dated July 6, 1943. Divided and this application April 16, 1943, Serial No. 483,264

8 Claims. (Cl. 248—171)

This application is a division of my co-pending application Ser. No. 392,080, filed May 6, 1941, now Patent 2,323,473, dated July 6, 1943.

This invention relates to a camera stand of the all-metal folding type.

In order that the principle of the invention may be readily understood, I have disclosed a single embodiment thereof in the accompanying drawings, wherein Fig. 1 is an elevation of the camera stand, with the legs spread to one of the predetermined positions and the central column partly extended;

Fig. 1a is a detail showing in operating position the handle for facilitating the swinging motion of the camera-stand head.

Fig. 2 is an enlarged, vertical, central section of the camera stand, showing the relation of the several parts of the camera stand head;

Fig. 3 is a detail in elevation of the central column locking member;

Fig. 4 is an enlarged horizontal section through Fig. 1 taken on the line 4—4 of Fig. 1;

Fig. 5 is a partial elevation of the camera stand in open condition, the central column structure being shown in section;

Fig. 6 is a detail of the extension spacer control knob;

Fig. 7 is an enlarged, elevational detail of one of the camera-stand leg braces;

Fig. 8 is an enlarged detail of the camera-stand leg brace partly in section, showing the spacing means engaged with one of the spacing notches;

Fig. 9 is a horizontal section through Fig. 8 on the line 9—9 thereof;

Fig. 10 is a horizontal section through Fig. 11 on the line 10—10 thereof; and

Fig. 11 is a view similar to Fig. 8, but showing the spacing mechanism disengaged, and showing the construction of the leg brace clutch.

There is a great need, supplied by my invention, for a camera stand of very rigid structure, capable of being extended to relatively high elevations without sacrificing rigidity. The objects of my invention are: to provide a camera stand having leg supports that can readily be positioned to a predetermined spacing of the legs; to provide a camera stand having leg supports that can be adjusted and securely locked so as to provide adjustment of the legs other than at an equal distance from the center of the camera stand; to provide a central, vertically adjustable support that can be removed from the camera stand and inverted; and to provide means preventing inadvertent withdrawal of the central member from the camera stand when the central column is the inverted position.

Referring first to Fig. 1, the camera-stand head is indicated generally at 20 (Figs. 1 and 2), and in connection therewith there is provided an adjustable central column of tubular form designated as 21, and which slides through a central support column 22 having a press fit into an upper leg bracket 23 having attached thereto three upper legs or leg members 24, 24, by means of pins 25, 25. To the lower end of the central support column 22 is attached a leg brace bracket 26, and attached thereto is a series of brace members 27, 27 by means of pins 28, 28. Fitted into each brace member 27 is a second member 29 having the form of a tube provided with a hinged end 29a, and attached to each brace member 27 is a clutch and spacing member designated generally at 30 and to be more fully described subsequently.

Each tubular member 29 is attached to its camera stand leg 24 which has attached thereto a suitable fitting 31 by means of a pin 32. The several legs 24, 24 are provided with the usual extensions and clutches or chucks indicated generally at 33, 33. This feature may be any of the well known camera-stand leg clutch or chuck structures, and need not be described herein in detail, but is referred to in pointing out that the camera stand is provided with triple legs. Such feature is more fully illustrated in Fig. 5, wherein the upper leg section 24 is shown as having a clutch or chuck member 34, and into such upper leg 24 is fitted a tube (not shown) provided with a clutch or chuck member 35, and fitted thereinto is a third tubular member 36 having attached thereto a swivel floor pad or foot 37.

Referring to Figs. 1 and 2, the central column 21 is provided with a threaded end 38, to which is threaded a head support member 39 to secure which to the central column 21 I have provided locking screws 40, 40 threaded into the head support member 39 through holes provided in the threaded portion of the central column 21. At the upper end of the head support member 39 is provided, preferably integral therewith, a threaded cylindrical extension 41 to which is threaded a rotating clamp screw or nut 42.

Passing through a hole in the head support member 39, as most clearly shown in Fig. 1, is the lower end of a pivot member 43 provided with a threaded hole 44 for receiving a retaining cap screw 45 or the like, under the head of which is placed a washer 46 for maintaining the proper relationship of the said pivot member 43 with respect to the head support member 39. Between said head support member 39 and the pivot member 43 is provided a friction washer 47.

In the construction shown, and which is claimed in my said Patent No. 2,323,473, when the nut 42 is turned in a clockwise direction, thus engaging the friction washer 47 and moving it into contact with the lower face of the pivot member 43, the latter tends to move in an upward direction, but is prevented from so moving by the washer 46 and the cap screw 45. Pressure will then be applied between the friction washer 47 and the lower face of the pivot member 43, thus locking or securing said pivot member 43 to the head support member 39. In order to prevent the said friction washer 47 from turning when the clamped nut 42 is turned, I have provided a locking pin 48 fitted into a hole in the said head support member 39 and into a second hole in the friction washer 47. The said pivot member 43 is provided with milled flat sides 49, 49, and at right angles to said flat sides is provided a through pivot hole into which is fitted a clamp screw 50, shown as horizontally positioned in the several figures and particularly Fig. 2. The said clamp screw 50 is provided with two threaded portions 51 and 52 of different pitch respectively, as, for example, the portion 51 having twenty threads per inch and the portion 52 having eighteen threads per inch, for reasons to be set forth in detail subsequently.

The camera-stand bracket is provided with a suitable disk-like top or head 53 having depending, spaced, parallel, side members 54, 55, to the lower ends of which are fitted threaded bushings 56, 57 respectively. Between the bushing 56 and the face 49 of the pivot member 43 is placed a friction washer 58, and between the bushing 57 and the face 49 of the pivot member 43 is a second friction washer 59. The said threaded bushings 56 and 57 are held in the side members 54 and 55 after they have been properly adjusted by locking screws 60, 61. The said clamp screw 50 is provided with a suitable manipulating knob 62, and the said threaded portions 51, 52 of the said clamp screw 50 are provided with threads having a right hand lead. If the said knob 62 is turned, thereby turning with it the clamp screw 50 and its differentially threaded portions 51, 52, the said threaded portion 51 is caused to advance in a right hand direction in bushing 56, and the differentially threaded portion 52 is caused to advance in a right hand direction in the bushing 57. Inasmuch as the threaded portion 51 has twenty threads to the inch in the assumed example, and the threaded portion 52 has eighteen threads to the inch in the described embodiment of my invention, the clamp screw 50 tends to advance further into the bushing 57 than into the bushing 56, thus causing the bushing 56 and the bushing 57 to be moved toward each other, thereby exerting pressure on the friction washers 58, 59, and the flat surfaces 49, 49 of the pivot member 43, and so locking the head side members 54 and 55 securely to the pivot member 43. It will be understood that within the scope of my invention other suitable differential pitches will be employed for the threaded portions 51, 52.

In order to facilitate the swinging motion of the camera-stand head 53, I have provided a boss 63 having a threaded hole 64, shown in Fig. 2, into which can be threaded a handle 65, shown in stored position in Fig. 5 and shown in operating position in Fig. 1a.

The camera-stand legs or upper legs 24, 24 are provided with hinge members 66, 66 hinged to the upper leg bracket 23, as best shown in Figs. 1 and 4. Also attached to the upper leg bracket 23 is the central support column 22, already described and best shown in Fig. 2, fitted to which (i. e., to the central support column 22) is a clamping bushing 67, shown in detail in Fig. 3, and which is cylindrical in shape and has a reduced diameter tightly fitted into the said central support column 22. The said clamping bushing 67 is provided with through saw slots 68, 68 which provide for a clamping action taking place on the area between them with respect to the adjustable central column 21. As best shown in Fig. 4, the bracket 23 is provided with a threaded hole 69, into which is threaded a column clamping screw 70 having a head 71 and a tapered end portion 72. When the head 71 is turned in a clockwise direction, the tapered end portion 72 is caused to be advanced into contact with the narrow section or area 73 of the bushing 67, provided by and between the saw slots 68, 68 as clearly shown in Fig. 4, thus causing the said narrow section or area 73 of the bushing 67 to be moved inwardly, thereby clamping the central column 21.

By this structure, the axial hole of said bushing 67 can provide a close fit about the outer wall of the central column 21, thus preventing any shaking or wobbling, while the said central column 21 is free to be moved in a vertical direction. Because of this close fit, a very slight movement of the clamping screw 70 will cause sufficient pressure to be applied to the central column 21 so as securely to clamp the latter to the leg support bracket 23.

It is desirable in a camera stand to have means for bracing or tying the stand legs in a selected position. In order to accomplish this, I have provided said central support column 22 and said leg brace bracket 26 which is securely attached thereto. This part of the structure is best shown in Fig. 5, where said central support column 22 has a press fit in a hole in the leg brace bracket 26, and to provide an additional guide to the central column 21 I have provided a bushing 74 having a close fit about the central column 21 and having a press fit in the hole in the leg brace bracket 26. Each of the several brace members 27, 27 is provided with a hinge member 75 attached to the leg brace bracket 26 by means of a pin 28. On the opposite ends of the several brace members 27, 27 I have provided chuck means clearly illustrated in Figs. 6 to 11.

In Fig. 11, the chuck is shown in the released condition, by which I mean that the inner support tube or tubular member 29 is free to move within the upper brace member 27, attached to which latter is a cylindrical sleeve or member 76, the lower end whereof is provided with threads 77, to which is threaded an outer clutch or chuck member 78. The lower end of the cylindrical sleeve or member 76 is provided with a countersunk opening 79, and about the tubular member or lower tube 29 is fitted an inner clutch or chuck shoe 80, which is a split-ring structure having a tapered end to fit the countersink 79 of the sleeve or member 76.

When the outer clutch or chuck member 78 is turned in a clockwise direction, the shoe 80 is caused to move upwardly in engagement with the countersunk face 79, thus causing the shoe 80 to be contracted and thereby securely clamping the lower support or tubular member 29 to the upper brace member 27. This provides an adjustment for varying the length of the supporting means made up of the series of brace members 27 and tubular members 29, within the range of the two chuck means.

However, it is often desirable to open the stand legs quickly to a predetermined position. For accomplishing this, I have provided transverse slot-like openings in each of the tubular members 29, indicated at 81 in Figs. 8 and 11, and indicated at 82 in Fig. 7. It is to be understood that any number of such transversely extending openings may be provided along the length of each tubular member 29 and spaced as desired. Attached to each cylindrical sleeve or member 76 is a spring 83 having an inwardly extending end 84 for engaging the said transversely extending opening 81 or 82, which inwardly extending end 84 passes through an opening 87a of the member 86 and an opening 84a of the brace member 27 and is held to the cylindrical sleeve member 76 by a screw 85.

In Fig. 8, the spring 83 is shown as engaging the transverse slot-like opening 81, but in Fig. 11 it is shown as withdrawn from said slot-like opening.

To provide means for controlling the position of each spring 83, I have provided a series of cylindrical members 86, one being shown in detail in Fig. 6 and having a groove 87, an opening 87a, and a ridge or rim 88, a portion of which is milled away as indicated at 89. Each said cylindrical member 86 is fitted over a brace member 27 and is held in position by the spring end 84 engaging groove 87 or opening 87a. When the cylindrical member 86 is in the position shown in Figs. 8 and 9, the flat or milled-away part 89 underlies the spring 83 and the spring end 84 thereof will engage the notch 81 or 82 of the corresponding brace member 29. When the cylindrical member 86 is turned to the position shown in Figs. 10 and 11, the spring 85 rides up on the ridge or rim 88, thus withdrawing the spring end 84 from engagement with the notch 81 or 82.

In normal operation, the camera stand being in closed condition, the cylindrical member 86 is turned to the position indicated in Fig. 7 and the leg members 24, 24 are swung outwardly until the transversely extending slot-like opening 81 is engaged by the spring end 84. All the legs 24 will then be moved out an equal distance from the central support column 22, and each will be stopped from further movement by the spring end 84 of the corresponding spring 83. The camera stand will normally be in very rigid condition. However, if severe conditions are present, such as strong winds or great vibration, each clutch or chuck 78 can also be tightened, thus securely clamping each tubular member 29 to its brace member 27, thus providing maximum rigidity.

When it is desired to close the tripod, the clutches or chucks 78, 78 are loosened and all the cylindrical members 86, 86 are turned to a position such as to withdraw the springs 83 from the several notches 81 or 82. The camera stand can then be closed to a compact condition.

In order to provide means for preventing the adjustable central column 21 from falling through the central support column 22, when in the inverted position, referred to in the statement of the objects of the invention, I have provided retainers made up of springs 90, 90, best shown in Fig. 5 as attached to a sleeve 91 by means of screws 92, 92, said sleeve 91 being attached to the adjustable central column 21 in any well known manner such as rivets or pins. The said springs 90, 90 are provided with bent-out ends 93, 93 which extend through openings in the said adjustable central column 21 provided therefor. The said column 21 can be withdrawn through the leg brace bracket 26 because of the tapered opening 94 (Fig. 5), but when the said adjustable central column 21 is reversed, there is no such taper provided in the leg brackets 23. Therefore, the spring ends 93, 93 prevent said adjustable central column 21 from passing therethrough.

In order to provide a convenient place for storing or carrying the tilting handle 65, as shown in Fig. 5, there is fitted a threaded block 95 into said adjustable central column 21. In the lower end of said adjustable central column 21, there is provided a cap 96 having an opening to receive the enlarged end 97 of the said handle 65, which, as stated, is shown in carrying position in Fig. 5.

For attaching a camera to the stand head herein disclosed, there is provided a threaded opening 98 into which is threaded a bushing 99 having an enlarged head 100. Fitted into said bushing 99 is the usual camera attaching screw 101 having an enlarged head 102, such structure providing means for adjusting the useable length of the said screw 101. If the bushing 99 is screwed in an upward direction, the useable length of the screw 101 becomes greater.

The folding camera stand herein disclosed is convenient to use, is very stable, and has sufficient adjustments to enable the operator to place the camera in almost any picture-taking position. The stand is a self-contained unit and folds into a very convenient package for transportation.

I have herein designated and claimed the camera stand as an all-metal one. While the preferred embodiment of my invention is that herein disclosed and is an all-metal structure, my invention and the claims directed thereto are of sufficient breadth to include any equivalents or substitutes for non-metal materials. I consider as within my invention the use of such substitute non-metallic materials, among which I may enumerate plastics which have recently been found applicable to many uses.

Having thus described one illustrative embodiment of the invention, it is to be understood that although specific terms are employed, they are used in a generic and descriptive sense and not for purposes of limitation, the scope of the invention being set forth in the following claims.

I claim:

1. In an all-metal, folding camera or like stand having a central support-column, with a central column adjustably supported therein, and with a a set of legs pivotally connected to such support-column, and having a set of leg brace members pivotally connected at opposite ends to said support-column and to said legs, the following construction or combination: means providing for the legs of the stand to be quickly opened manually by the operator to any one of a series of different predetermined spread positions and thereupon to be locked therein by the operator, the said means including spaced transverse openings provided in the respective said pivoted leg brace members at different points along the length thereof, and a spring attached to each such leg brace member and having a protruding part engageable alternatively with any one of the openings in that leg brace member when the pivoted legs of the stand have been opened by the operator for that purpose, thereby locking said pivoted legs in the selected spread condition, a sleeve member upon each leg brace member and carrying such spring for such leg brace member, and a chuck member on such leg brace member into which the respective sleeve member is threaded.

2. A combination according to claim 1, but in which each of said springs is attached to a sleeve member carried by the leg brace member and in which there is provided a chuck member to which the respective sleeve member is threaded, and in which as means to control the position of each said spring there is provided upon each leg brace member adjacent to the said spring a cylindrical member having a rim, a groove adjacent thereto, an opening in said groove and a milled-away part upon said rim.

3. An all-metal, folding camera or like stand with head, including in combination a central support-column a central column adjustably supported therein, a set of legs pivotally connected to said support-column, a set of leg brace members pivotally connected at opposite ends to said support-column and to said legs respectively, and means for locking the stand legs quickly in any one of a series of different predetermined spread positions, said means including spaced, transverse openings provided in the respective leg brace members, and a spring mounted on each leg brace member and having a part to engage any one of said openings in the respective leg brace members, together with sleeve members carrying said springs respectively and a chuck member to which the respective sleeve member is threaded, said sleeve members and chuck members being mounted upon said leg brace members respectively.

4. An all-metal, folding camera or like stand with head, including in combination a central support-column, a central column adjustably supported therein, a set of legs pivotally connected to said support-column, a set of leg brace members pivotally connected at opposite ends to said support-column and to said legs respectively, and means for locking the stand legs quickly in any one of a series of different predetermined spaced positions, said latter means including spaced, transverse openings provided in the respective leg brace members, and a spring mounted on each leg brace member and having a part to engage either of said openings in the respective leg brace members.

5. An all-metal, folding camera or like stand with head, including in combination a central support-column, a central column adjustably supported therein, a set of legs pivotally connected to said support-column, a set of leg brace members pivotally connected at opposite ends to said support-column and to said legs respectively, and means for locking the stand legs quickly in any one of a series of different predetermined spaced positions, said last mentioned means including for each leg brace member a cylindrical member thereon and having a rim, a groove adjacent thereto and an opening provided in said groove and a milled-away part upon said rim.

6. An all-metal, folding camera or like stand with a swingingly adjustable head provided with a formation to receive detachably a handle member for use in swinging said head, and including in combination a central support-column, a long, hollow, central column adjustably supported therein and protruding at both ends therefrom, a set of legs pivotally connected to said support-column adjacent the upper end thereof, said central support-column having a set of brace members pivoted at their upper ends thereto near the lower end of said support-column and materially above the lower downwardly protruding end of said central column and below and distant from the pivotal point of connection of said set of legs, said brace members at their lower ends being pivotally connected to said legs respectively, said central column thus constituting a tubular closed construction received within said support-column and ending a substantial distance below the lower end of said support-column, said central column having a block fitted thereinto substantially above the lower end thereof and having a threaded socket, the said handle member having at one end a threaded portion receivable in the threaded socket of said block and when so received being supported within and entirely received within and concealed by the said central column excepting the extreme outer end thereof, which is accessible to facilitate removal of said handle member from said central column, said handle member upon removal from its said position being engageable with said formation of the camera stand head to facilitate the swinging motion of the camera stand head.

7. A clamping bushing for a folding stand for a camera or like object, for adjustably connecting two upright, aligned, tubular parts thereof, such as a central support-column and a central column, said bushing being of tubular form, and having one end portion thereof telescoped with respect to one of said two tubular parts of the folding stand, and having the other end portion thereof telescoped with respect to the other of said tubular parts of the folding stand, one of said end portions of the bushing having spaced, substantially parallel, elongated, through saw-cuts providing between them an elongated, resilient area to afford a clamping action against the tubular part of the folding stand with which it is telescoped, and co-acting clamping means engaging the outer surface of said resilient area to press the said resilient area against the part of the folding stand with which it has a telescoped relation.

8. An all-metal, folding camera or like stand with a swingingly adjustable head provided with a formation to receive detachably and in combination with a handle member for use in swinging said head, and including in combination a long central support-column, a longer central column adjustably supported therein and protruding at its upper end materially above the upper end of said central support-column, thereby supporting said head materially above and materially spaced from the upper end of said central support column, a set of legs pivotally connected to said support-column, said central column constituting an elongated tubular closed construction received within said support-column and ending a substantial distance below the lower end of said support column, said central column having a block fitted thereinto substantially above the lower end thereof and having a threaded socket to receive a threaded part of said handle member, thereby supporting the entire handle member within the lower part of the central column, whereby said handle member is entirely received within and is concealed by the said central column excepting the extreme outer end thereof which is accessible to facilitate removal of said handle member from said central column.

TORKEL KORLING.